(12) United States Patent
Kornsteiner et al.

(10) Patent No.: US 7,556,132 B2
(45) Date of Patent: Jul. 7, 2009

(54) SLIDING CLUTCH

(75) Inventors: Walter Kornsteiner, Zwischenwasser/Vbg. (AT); Reinhold Lenherr, Staad (CH); Karl Heinz Spari, Krottendorf (AT)

(73) Assignee: EJOT GmbH Co. KG (DE)

( * ) Notice: Subject to any disclaimer, the term of this patent is extended or adjusted under 35 U.S.C. 154(b) by 285 days.

(21) Appl. No.: 11/378,494

(22) Filed: Mar. 17, 2006

(65) Prior Publication Data

US 2006/0213744 A1 Sep. 28, 2006

(30) Foreign Application Priority Data

Mar. 18, 2005 (DE) .................. 10 2005 012 652

(51) Int. Cl.
*F16D 7/02* (2006.01)
*F16H 57/00* (2006.01)
*F16H 55/17* (2006.01)

(52) U.S. Cl. ................ 192/56.1; 74/411; 74/435

(58) Field of Classification Search ............ 74/411, 74/432, 435, 439, 446, 450; 192/56.1; 464/30, 464/41, 42, 45
See application file for complete search history.

(56) References Cited

U.S. PATENT DOCUMENTS

| | | | |
|---|---|---|---|
| 2,976,741 A * | 3/1961 | Martin | 74/432 |
| 3,080,735 A * | 3/1963 | Blom, Jr. et al. | 464/30 |
| 3,186,190 A | 6/1965 | Maillot | |
| 3,406,583 A * | 10/1968 | Baier | 74/411 |
| 3,651,705 A * | 3/1972 | Bertinetti et al. | 474/161 |
| 5,802,920 A * | 9/1998 | Becker | 74/439 |
| 5,913,937 A * | 6/1999 | Lin | 74/411 |
| 6,283,863 B1 | 9/2001 | Lang et al. | |
| 6,481,512 B1 | 11/2002 | Nagatsuka | |
| 6,527,427 B1 * | 3/2003 | Schroder | 362/524 |
| 2004/0067795 A1 | 4/2004 | Cydzik et al. | |
| 2004/0129096 A1 | 7/2004 | Vilou et al. | |
| 2006/0009294 A1 * | 1/2006 | Ibrahim et al. | 464/42 |

FOREIGN PATENT DOCUMENTS

| | | |
|---|---|---|
| DE | 199 20 689 A1 | 12/2000 |
| DE | 102 10 917 C1 | 11/2003 |
| JP | 2002 316583 | 10/2002 |

* cited by examiner

Primary Examiner—Roger Pang
(74) Attorney, Agent, or Firm—Wood, Phillips, Katz, Clark & Mortimer

(57) ABSTRACT

The present invention relates to a sliding clutch made of plastic material, which is especially suitable for the use in adjustment drives for vehicular exterior mirrors. The sliding clutch thereby comprises a first clutch part and a second clutch part, wherein the first clutch part and the second clutch part abut one another with planar faces in such a way that they are into engagement with one another up to a maximum torque only because of static friction. In this way, a sliding operation without rattling noises can be guaranteed. For achieving this safety function by means of which no force or torque transmission occurs from a predetermined torque range, no further mechanical components or additional electrical controls are required.

9 Claims, 1 Drawing Sheet

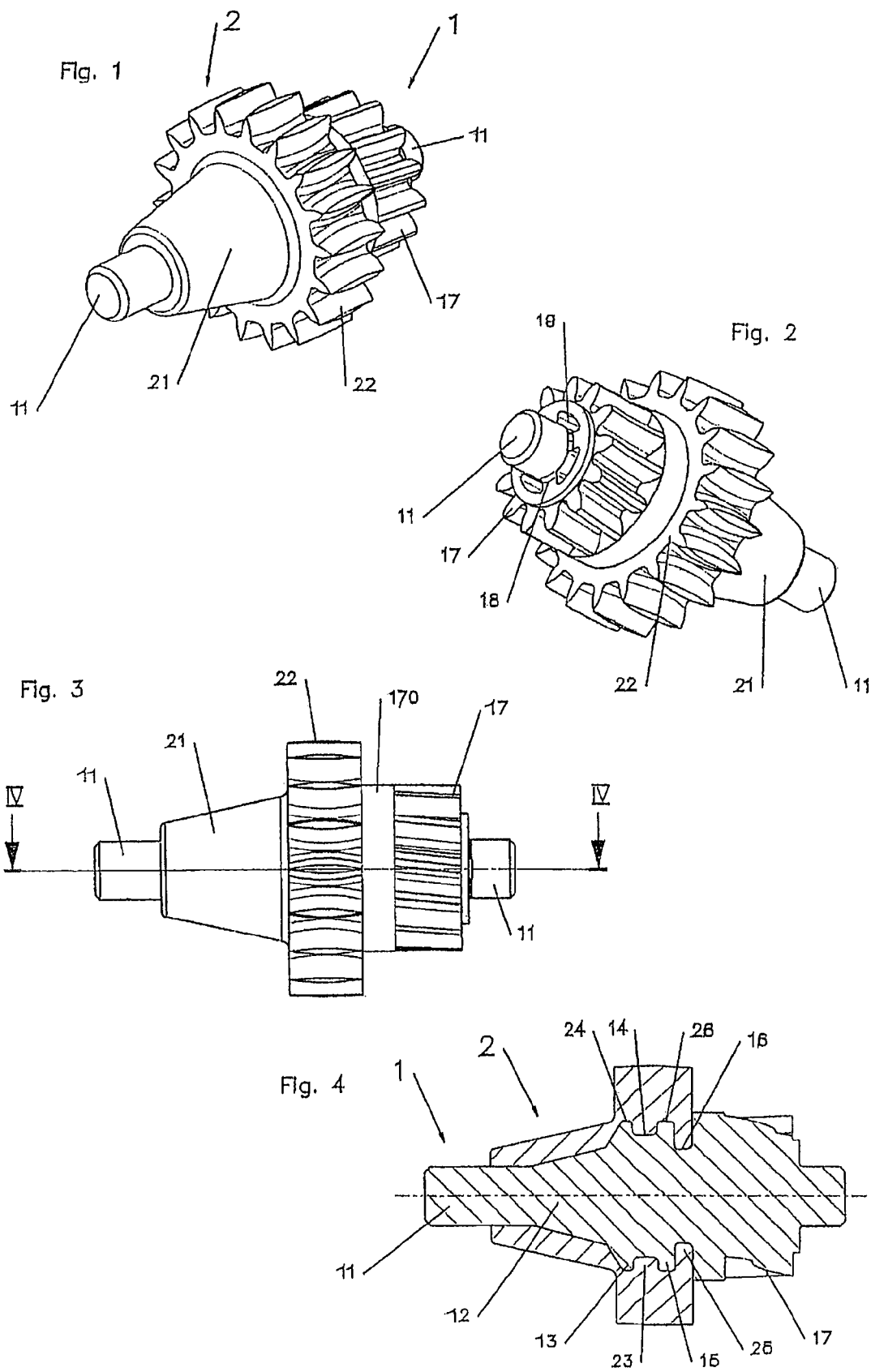

SLIDING CLUTCH

The present invention relates to a sliding clutch, especially for use in adjustment drives for vehicular exterior mirrors.

From DE 199 20 689 A1, a device for adjusting the distance between a first and a second component is known, which preferably serves for the horizontal and vertical adjustment for vehicular headlights. The device comprises an adjustment screw and a drive, wherein the drive or the adjustment screw comprises a sliding clutch made of plastic. This sliding clutch consists of a first clutch part and a second clutch part. Thereby at least one of the two clutch parts comprises a resilient ring having first engagement means being arranged at the circumference thereof, wherein the engagement means are in engagement with corresponding second engagement means at the second clutch part up to a maximum torque.

In this device, a rattling noise is generated because of the engagement means, if the maximum torque is exceeded and the sliding clutch begins sliding operation. The rattling noise was considered as disturbing by many car owners.

From DE 102 10 917 C1, a braking device having a free wheel respectively a rotation damper, is known. The braking device comprises a first housing, in which a first chamber is arranged, which contains viscose fluid—as for example silicon oil—and is sealed with regard to the exterior. Within the chamber, a braking rotor is rotatably arranged, wherein the housing and the braking rotor are connected with a pinion, wherein the pinion itself cooperates with a toothed rack or a toothed wheel at the part which has to be braked. Thereby, the first housing is floatingly arranged in a second chamber of a second housing. The circumference of the first housing and a blocking portion of the wall of the second chamber are formed in such a way that between the first and the second housing a rotational positive locking is generated, if in addition to the torque at the pinion, a linear first force component moves the first housing and the blocking portion towards another and generates free movement between the first and the second housing, if a second force component opposite to the first force component acts at a first and second housing.

Such braking devices are applied especially in the automotive area, e.g. for braking the swinging of glove box caps when they are opened or handles being arranged at the vehicular sealing after release, but also for ashtrays and coffee cup holders. For the transmittal of torques with overload limiters, they are however not suitable, since this does not relate to a dampening of a linear movement.

Further, a sliding clutch is known, in which the overload limiter is realized by means of a metal spring, which slides through at a predetermined torque between the clutch parts.

For this sliding clutch, an appropriate lubricant has to be chosen, which acts between the shaft and the metal spring. This lubricant is partly responsible for the torque to be transmitted and is very difficult to adjust. Further, in this case the assembling is more complex and thus more expensive.

It is the object of the present invention to provide a sliding clutch, which does not use mechanical lockings or additional parts as for example metal springs or silicon oil and can be manufactured in a specially simple and cost-effective manner.

This object is solved according to the invention, in that the first clutch part and the second clutch part abut with planar faces in such a way that they are into engagement up to a maximum torque just because of static friction. The planar faces between the first and the second clutch part do not comprise mechanical engagement means, as for example grooves and projections. By not applying mechanical engagements, a practically continuous rotation of the first clutch part in the second clutch part is provided in the sliding operation, so that no disturbing rattling occurs and the rear-view mirror does also not pulsate. Thus, no further components are necessary, so that a complex assembling is avoided.

In a preferred embodiment of the invention, the first clutch part includes shaft ends, a conical area, a first and a second projection and a first and a second recess as well as a driving area, and the second clutch part comprises a head area, which at least encloses the conical area, and an adjustment area, which comprises a first and a second projection as well as a first and a second recess, which respectively correspond with the first and second recess respectively the first and second projection of the first clutch part. By means of this special geometric arrangement, it is possible that between the clutch parts a sufficient high static friction is generated. However, other embodiments are also conceivable.

In a further preferred embodiment of the invention, a smooth section follows the driving area of the first clutch part in axial direction. Thereby, it is prevented that a driving means for the driving area of the first clutch part contacts the adjustment area of the second clutch part. By means of this section, depending on the component requirement, also distances between drive and toothed driving wheel may be adjusted.

Preferably, the driving area and the adjustment area are formed as toothed wheels. In this way, an effective adjustment mechanism is provided.

Preferably, the first clutch part and the second clutch part are formed by two component injection molding. This method is very simple and cost-effective. Thereby, the first clutch part is formed from a first plastic material in a first cavity, and the second clutch part is formed from a second plastic material in a second cavity, wherein the first clutch part at least represents a part of the second cavity. In this way, it is guaranteed that the connection of the two clutch parts is free of play, which is necessary with regard to the required static friction. Therefore, the material pairs have to be chosen in such a way that they do not build-up chemical adhesion, i.e. covalent bonds in the two component injection molding. Examples for suitable material pairs are illustrated in the following table:

TABLE 1

| First clutch part | Second clutch part |
| --- | --- |
| PBT-GF (Polybutylene terephthalate with fiber glass proportion) | POM (Polyoxi methylene) |
| PA-GF (Polyamide with fiber glass proportion) | POM (Polyoxi methylene) |
| PBT-GF (Polybutylene terephthalate with fiber glass proportion) | PA (Polyamide) |
| PPS (Polyphenylene sulfide) | PET (Polyethylene terephthalate) |

Due to the fact that regularly the plastic material from which the second clutch part is made of comprises a higher shrinkage than the plastic material from which the first clutch part is formed, a tight fit is achieved. This is in turn required for the necessary static friction and prevents that the second plastic part lifts off from the first plastic part. With regard to the toothed wheel form of the driving area and the adjustment area, preferably only such thermoplastic polymers are used, which comprise a semi-crystalline structure.

The sliding clutch according to the invention may, with regard to the geometries of the first and the second clutch part, also be formed in a different way as described in the preferred embodiments. It is important that the maximum torque can be adjusted by a specific extent of surface overlapping between the first and the second clutch part. This means that the function of the inventive sliding clutch is based on static friction.

An embodiment of the present invention is illustrated by means of the accompanying drawings.

It shows:

| FIG. 1 | a perspective view of an inventive sliding clutch, |
|---|---|
| FIG. 2 | a further perspective view of an inventive sliding clutch, |
| FIG. 3 | a side view of the inventive sliding clutch, |
| FIG. 4 | a cross-sectional view along the line IV-IV from FIG. 3. |

FIG. 1 shows the sliding clutch with the first clutch part 1 and the second clutch part 2. The second clutch part 2 with the head area 21 and the adjustment area 22 is thereby placed onto the first clutch part 1, from which the shaft ends 11 and the driving area 17 are visible. The driving area 17 of the first clutch part 1 and the adjustment area 22 of the second clutch part 2 are respectively formed as toothed wheels. The driving area 17 of the first clutch part 1 is driven via an electric motor (not shown), wherein the movement of the adjustment area 22 of the second clutch part 2 is for example transmitted to an exterior mirror of a motor vehicle (not shown), so that the latter can be adjusted. In FIG. 2, especially the driving area 17 of the first clutch part 1 can be seen from a different perspective. The toothed wheel is connected via four webs 18 with the shaft end 11. Between the webs 18 cavities 19 are formed respectively.

FIG. 3 shows a side view of the inventive sliding clutch with the head area 21 and the adjustment area 22 of the second clutch part 2 and the shaft ends 11 and the driving area 17 of the first clutch part 1. The toothed wheel shaped driving area 17 is preferably followed in axial direction by a smooth section 170, by means of which the first clutch part 1 abuts the adjustment area 22 of the second clutch part 2. By means of the smooth section 170, it shall be prevented that a driving means for the driving area 17 contacts the adjustment area 22 of the second clutch part 2. The teeth of the toothed wheel shaped driving area 17 may be a little bit inclined with regard to the center line of the sliding clutch, whereas the teeth of the toothed wheel shaped adjustment area 22 are usually aligned in axial direction. Depending on the requirements of the component, different force transmission means, as for example grooves, are conceivable.

In FIG. 4, a cross-section along the center line of the sliding clutch is illustrated. One can recognize that the first clutch part 1 and the second clutch part 2 are assembled in the way of a shaft hub joint, wherein they abut with planar faces. The shaft ends 11 of the first clutch part 1 are followed preferably by a conical area 12, which is in turn followed by a projection 13, a recess 14, a further projection 15 and a further recess 16. The recess 16 is followed by the smooth section 170 and finally by the driving area 17. The second clutch part 2 is placed onto the first clutch part 1 in such a way that the head area 21 encloses at least a conical area 12 of the first clutch part 1 and when applicable a part of a shaft end 11. The adjustment area 22 of the second clutch part 2 comprises the projections 23, 25 and the recesses 24, 26, which respectively correspond with the recesses 14, 16 and the projections 13, 15 of the first clutch part 1. Thereby, the recess 16 is formed deeper as the recess 14 respectively the projection 25 bigger than the projection 23. The projections 13, 15 have the same size. The same applies thus also for the recesses 24 and 26. By means of this embodiment, planar abutting surfaces between the first clutch part 1 and the second clutch part 2 are generated by means of which a static friction between the first clutch part 1 and the second clutch part 2 is achieved which is sufficient for the transmission of relatively small torques. Depending on the material choice, also different embodiments of the two clutch parts 1, 2 are conceivable. For example, more than two projections respectively recesses may be provided and instead of a conical area, also a cylindrical area may be provided, for example, etc.

During operation, the torque is transmitted from the first clutch part 1 functioning as shaft to the second clutch part 2 functioning as hub, only because of static friction. If for example a rear-view mirror or another adjustment element can no longer be adjusted, because an end stop of the adjustment part is reached, the hub respectively the second clutch part 2 is blocked. In order to prevent damage of the components, a overload limiter was created for such a case. The latter functions in such a way that the sliding clutch begins the sliding operation if a maximum torque is reached, i.e. the static friction threshold between the first clutch part 1 and the second clutch part 2 is exceeded and there is a relative movement between the planar faces of both parts, wherein the first clutch part 1 rotates without positive engagement and without rattling in the stationary second clutch part 2. If subsequently the torque again falls below the static friction threshold, the relative movement stops and torque can again be transmitted, i.e. an adjustment in the opposite direction can be carried out. The present invention is yet not limited to the use in adjustment drives of vehicular exterior mirrors. An analogue application is conceivable with regard to ventilation flaps in the air-conditioning technology as well as in respective areas in domestic engineering or electrical engineering.

The invention claimed is:

1. Sliding clutch made of plastic material which comprises a first clutch part and a second clutch part, characterized in that the first clutch part and the second clutch part abut one another with planar faces in such a way that they are into engagement with one another up to a maximum torque only because of static friction, further characterized in that the first clutch part includes shaft ends, a conical area, a first and a second projection, a first and a second recess as well as a driving area, and that the second clutch part comprises a head area, which at least encloses the conical area, and an adjustment area, which includes a first and a second projection as well as a first and a second recess, which respectively correspond with the first recess and the second recess and respectively with the first projection and the second projection of the first clutch part.

2. Sliding clutch made of plastic material according to claim 1, characterized in that the driving area of the first clutch part is followed in axial direction by a smooth section.

3. Sliding clutch made of plastic material according to claim 1, characterized in that the driving area and the adjustment area are formed as toothed wheels.

4. Sliding clutch made of plastic material according to claim 1, characterized in that the first clutch part and the second clutch part are produced by two component injection molding.

5. Sliding clutch made of plastic material according to claim 2, characterized in that the driving area and the adjustment area are formed as toothed wheels.

6. Sliding clutch made of plastic material according to claim 1, characterized in that the first clutch part and the second clutch part are produced by two component injection molding.

7. Sliding clutch made of plastic material according to claim 2, characterized in that the first clutch part and the second clutch part are produced by two component injection molding.

8. Sliding clutch made of plastic material according to claim 3, characterized in that the first clutch part and the second clutch part are produced by two component injection molding.

9. Sliding clutch made of plastic material according to claim 5, characterized in that the first clutch part and the second clutch part are produced by two component injection molding.

* * * * *

UNITED STATES PATENT AND TRADEMARK OFFICE
Certificate

Patent No. 7,556,132 B2                                                              Patented: July 7, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Walter Kornsteiner, Zwischenwasser/Vbg. (AT); Reinhold Lenherr, Staad (CH); Karl Heinz Spari, Krottendorf (AT); and Dr. Rolf Künkel, Bad Berleburg (DE).

Signed and Sealed this Twenty-second Day of December 2009.

ROBERT SICONOLFI
*Supervisory Patent Examiner*
Technology Center 3600